United States Patent Office 2,890,836
Patented June 16, 1959

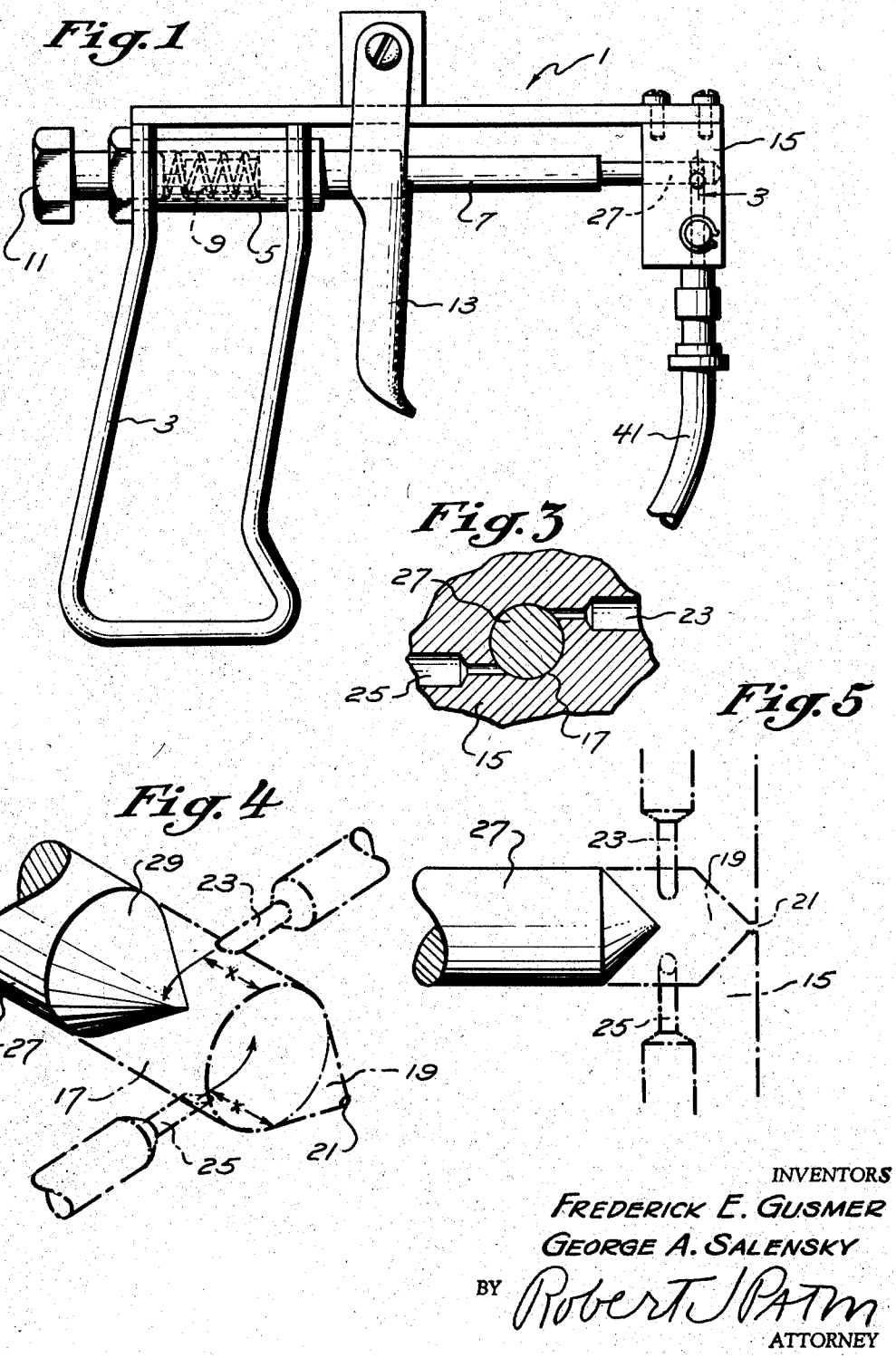

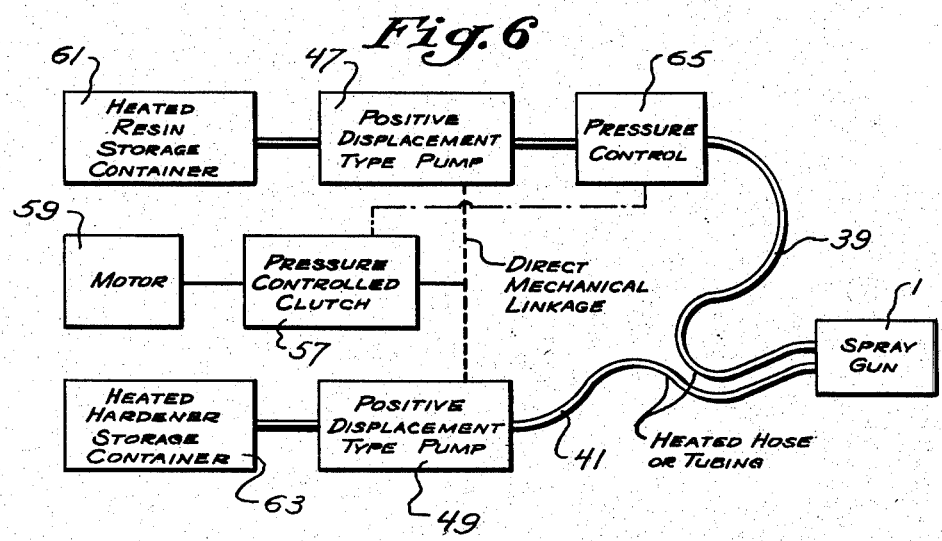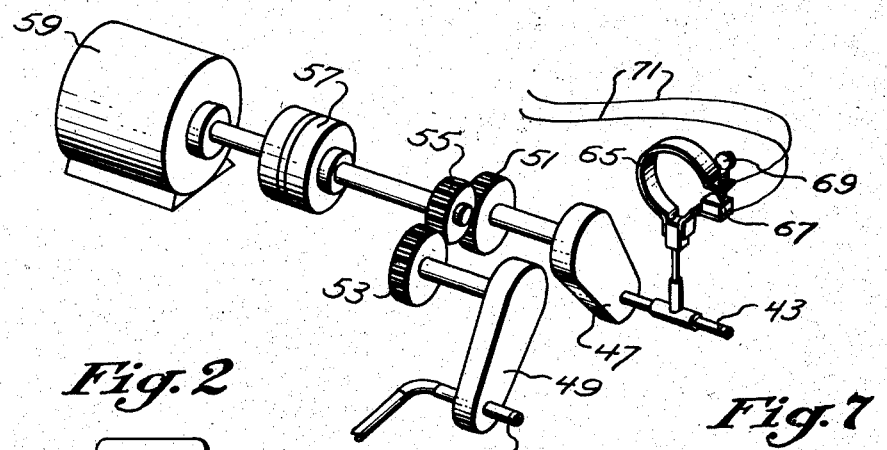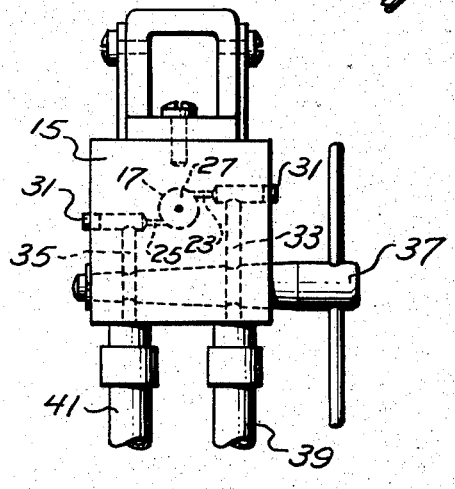

2,890,836

APPARATUS FOR APPLYING A MIXTURE OF A PLURALITY OF LIQUIDS

Frederick E. Gusmer, Westfield, and George A. Salensky, Leonia, N.J., assignors to A. Gusmer, Inc., Hoboken, N.J., a corporation of New Jersey Application December 21, 1956, Serial No. 629,893

2 Claims. (Cl. 239—117)

This application is a continuation-in-part of our copending application Serial No. 562,691, filed February 1, 1956, now abandoned.

The present invention relates to apparatus and methods for spraying a mixture of a plurality of liquids, and more particularly for spraying a homogeneous mixture of liquids which must be mixed as nearly concurrently with spraying as possible. The invention has utility in a number of fields, such as the spraying of foam, the spraying of highly exothermic mixtures, and the spraying of thermosetting resin formulations. It will be illustrated, by way of example, in connection with the spraying of thermosetting resins.

The principal object of the present invention is the provision of apparatus and methods for spraying a homogeneous mixture of a plurality of liquids, in which a truly homogeneous mixture is formed in the apparatus prior to spraying, but in which all portions of the mixture are exhausted from the apparatus a minimum length of time after spraying.

Another object of the present invention is the provision of apparatus and methods for spraying a homogeneous mixture of a thermosetting resin and its hardening agent, such that the mixture will not clog the apparatus when the latter is operated intermittently, as is necessary for the practical application of protective coatings.

A further object of the invention is the provision of methods for spraying a mixture of a plurality of liquids, in which a visual indication of the proportioning and of the completeness of mixing is provided.

Still another object of the present invention is the provision of methods for spraying a mixture of a plurality of liquids, which will be easy, inexpensive and reliable to practice.

Finally, the present invention contemplates apparatus for spraying a mixture of a plurality of liquids, which will be relatively inexpensive to manufacture, simple to operate, maintain and repair, and rugged and durable in use.

Other objects and advantages of the present invention will become apparent from a consideration of the following description, taken in conjunction with the accompanying drawings, in which:

Figure 1 is a side elevation of a spray gun according to the present invention;

Figure 2 is a front end elevation of the device of Figure 1;

Figure 3 is an enlarged cross-section on the line 3 of Figure 1;

Figure 4 is a perspective view, with parts shown in phantom line for clarity, of the structure adjacent the mixing chamber of the apparatus of the present invention;

Figure 5 is a view similar to Figure 4, but showing a top plan view;

Figure 6 is a diagram of apparatus according to, and for carrying out the methods of, the present invention; and Figure 7 is a schematic perspective view of that portion of the apparatus which supplies a plurality of liquids to the spray gun.

APPARATUS

Referring now to the drawings in greater detail, there is shown a spray gun indicated generally at 1 and comprising a handle 3 on which is mounted a cylindrical barrel 5 open at both ends and slidably receiving in its front end the rear end of a valve stem 7 urged forward by a compression spring 9 which is adjustably stressed by an adjustment nut 11 contacting the rear end of spring 9. A trigger 13 is pivotally mounted at its upper end on handle 3 and contacts an abutment shoulder on stem 7 selectively to move stem 7 rearwardly against the action of spring 9. Screw 11 adjustably contacts the rear end of stem 7 to limit rearward movement of stem 7.

Mounted on the front end of the spray gun is a spray head 15, comprising means defining a cylindrical chamber 17 having a tapered front end portion 19, which in the embodiment shown is conical, terminating at its forward end in an outlet opening or spray discharge orifice 21 coaxial with chamber 17.

Chamber 17 has a pair of inlet openings 23 and 25 providing injection jets through which different liquids may be injected under pressure into chamber 17. In the embodiment illustrated, opening 23 introduces a liquid thermosetting resin; and opening 25 introduces a liquid hardening agent for that thermosetting resin. It will of course be understood that more than two inlet openings may be provided.

The axes of openings 23 and 25 lie in a common plane perpendicular to the axis of chamber 17. The axes of openings 23 and 25 are parallel and are spaced equal distances from the axis of chamber 17.

The axes of openings 23 and 25 in the illustrated embodiment do not bisect chamber 17 diametrically, nor are they disposed tangentially relative to chamber 17; but instead, they intersect chamber 17 chordally. It has been found in practice that when the axes of openings 23 and 25 are disposed either diametrically or tangentially relative to chamber 17, the effectiveness of mixing in chamber 17 is substantially reduced; and hence, the chordal arrangement shown best in Figure 3 is preferred as providing for optimum mixing.

Inlet openings 23 and 25 are spaced equal distances from tapered portion 19 along chamber 17. These distances are indicated by the reference character X in Figure 4. This equal spacing is shown best in Figure 5 and results in optimum mixing of the liquids. If openings 23 and 25 are placed anywhere along tapered portion 19 or at the intersection of the cylindrical portion of chamber 17 and tapered portion 19, it has been found that portions of each liquid stream tend to escape from outlet opening 21 without mixing with the other streams. The equal spacing of openings 23 and 25 from tapered portion 19 results in homogeneous mixing and serves an additional purpose to be described later.

The forward end of stem 7 comprises a plunger 27 of cylindrical cross-section and having a close but slidable fit within chamber 17. Plunger 27 terminates forwardly in a tapered front end 29, which is conical in the embodiment shown. Front end 29 of plunger 27 is complementary with tapered front end portion 19 of chamber 17. Thus, plunger 27 as a whole is complementary with all of chamber 17. It will therefore be seen that when trigger 13 is retracted into abutment with barrel 5, plunger 27 will be drawn rearwardly so as simultaneously to expose inlet openings 23 and 25. When trigger 13 is released, plunger 27 moves forwardly, first closing openings 23 and 25 simultaneously and then seating fully in chamber 17 so as completely to fill chamber 17 and eject all liquids therefrom and to close outlet opening 21. The additional advantage of equal spacing of openings 23 and 25 from tapered portion 19 of chamber 17 will now be clear, in that this equal spacing assures that material entering through openings 23 and 25 will be admitted simultaneously and shut off simultaneously, with the result that neither at the beginning nor at the end of the spray period will an unmixed liquid be sprayed.

The outer ends of openings 23 and 25 are closed by plugs 31 for ease of manufacture and cleaning; and openings 23 and 25 receive resin and hardening agents, respectively, from openings 33 and 35. Openings 33 and 35 are selectively closeable by a manual shutoff valve or stopcock 37.

Openings 33 and 35 are supplied with resin and hardener, respectively, through flexible hoses 39 and 41 attached to spray head 15 by conventional hose couplings and supplied from the outlets 43 and 45 of positive displacement type pumps 47 and 49 driven by interchangeable gears 51 and 53 from a common drive pinion 55 in unitary assembly with the output of an electromagnetic clutch 57 having its input driven by an electric motor 59. Gears 51 and 53 may be selected in any desired ratio so as properly to proportion the resin and hardener relative to each other.

Heated resin is supplied from a heated resin storage container 61 to its associated pump 47; and a similar container 63 is provided for supplying hardener to its associated pump 49. The containers 61 and 63 are heated to maintain their contents at a suitable viscosity; and hoses 39 and 41 are provided with electric resistance heating coils (not shown) to maintain the liquids at the desired temperatures.

A pressure control for the resin line is provided, comprising a Bourdon tube 65, a close action microswitch 67, and an adjustment screw 69 to set the desired pressure. Switch 67 is connected by wires 71 to clutch 57. As pressure in the hose 39 increases, Bourdon tube 65 expands to a fixed extent determined by the set pressure, whereupon switch 67 opens, clutch 57 is released, and pumps 47 and 49 stop.

In practice, the speed of the pumps is adjusted slightly higher than needed to supply sufficient liquid to the spray gun. Thus, when the gun is in operation, the pumps are continually starting and stopping, the "on" time being automatically controlled by tube 65. In actuality, pumps 47 and 49 supply the liquids to the lines in a series of pulsations. However, the flexible hoses 39 and 41 permit a small dimensional change with pressure changes, thus absorbing the pulsations by acting somewhat in the manner of a cushion. The cushioning effect along the supply line is sufficient that the pressure at the gun remains substantially constant. No pressure control is needed in the hardener line, since the pressure in this latter is automatically fixed by the back pressure exerted at the mixing chamber.

RESIN FORMULATION

Among the suitable thermosetting resins are epoxy, polyurethane and polyester resins. Phenolaldehyde type resins may be used if a solvent is employed. Particularly preferred, however, are the epoxy resins, since they exhibit relatively little shrinkage during polymerization or cross linkage, and since cross linkage takes place without the formation of any secondary products as would hamper a cure of thick films at atmospheric pressure. Epoxy resins are ordinarily the reaction products of polyhydric phenols and epihalohydrins. Broadly, however, it is necessary only that an epoxy resin have a plurality of groups having an ether oxygen atom joined to two adjacent or vicinal carbon atoms which, in turn, are joined to each other.

It is to be understood that a mixture of two or more thermosetting resins may also be used.

Hardening agents for thermosetting resins fall into two groups: curing agents which cross-link with the resin to form an infusible solid, and catalytic agents which promote polymerization of the resin. Both types of hardening agent are useful in the present invention. With a polyester resin, a polyisocyanate hardener may be used to produce a polyurethane type coating. Benzol peroxide also may be used as a hardener for polyester resins. Hexamethylenetetramine is a suitable hardening agent for phenolaldehyde resins.

In the case of the epoxy resins, the amine hardeners are preferred, but an acid hardener such as phthalic anhydride or an ionic type of catalyst such as boron trifluoride may also be used. Among the suitable amine hardeners are metaphenylenediamine, pyridine, dimethylaminopropylamine, piperidine, diethylenetriamine, triethylenetetramine, tetraethylenepentamine, and reaction products of these with a portion of the epoxy resin.

It is sometimes desirable to regulate the thixotropicity of the resin formulation. Thixotropicity is that property of a fluid by which the viscosity varies inversely with the degree of agitation. Thus, a thixotrophic fluid will have a substantially lower viscosity during mixing and spraying than it will have when it comes to rest on a surface; and this property is useful to assure that the sprayed liquid will not run when applied to a smooth surface. It is ordinarily not necessary to render the liquids thixotrophic when they are to be sprayed on a rough surface or when they are used for impregnating materials. The required degree of thixotropicity may be imparted to thermosetting resins by the inclusion of a small proportion of finely powered silica.

It is desirable to impart distinctively different colors to the resin and to its hardener, so that a visual indication of the effectiveness of mixing will be provided. For example, 1.6 percent by weight of cadmium silicate will impart a distinctive yellow color to the resin; and 9 percent by weight of cobalt aluminate will impart a distinctive blue color to the hardener. When proper mixing occurs, the sprayed resin formulation will be a uniform green.

OPERATION

In operation, spray gun 1 is held in the hand of the operator by means of handle 3. With trigger 13 in its forward position, plunger 27 completely fills chamber 17; closing inlet openings 23 and 25 and outlet opening 21. Switch 67 is open, so that clutch 57 is disengaged and no pumping action takes place.

When trigger 13 is moved rearwardly, plunger 27 also moves rearwardly, first to open outlet opening 21, and thereafter to open inlet openings 23 and 25 simultaneously. Streams of resin and hardener spurt simultaneously into chamber 17; and a rapidly twirling body of liquid comprising a mixture of resin and hardener is established, which has rotary motion in chamber 17. The entering streams are equally spaced from the tapered portion 19 of chamber 17 and from the axis of chamber 17 and from outlet opening 21, so that neither entering stream can exit through outlet opening 21 before the other. Moreover, the axes of inlet openings 23 and 25 lie in a common plane perpendicular to the axis of chamber 17, so that chamber 17 is largely filled with a highly agitated and thoroughly mixed liquid before spraying begins. Thus, all liquid exiting through outlet opening 21 will comprise a homogeneous mixture of resin and hardener; and when resin and hardener are distinctively differently colored, for example, yellow and blue, even the first sprayed droplets will be a uniform green.

When spraying is to be discontinued, trigger 13 is released, thereby permitting plunger 27 to move forwardly again toward the front end of chamber 17, during which movement it will first simultaneously close inlet openings 23 and 25, thereby shutting off all liquid flow into chamber 17 and permitting presure to build up to the point that switch 67 opens and remains open, thus disengaging clutch 57 and terminating the pumping action. Thereafter, continued movement of plunger 27 in a forward direction causes tapered front end 29 of plunger 27 to move into contact with tapered front end portion 19 of chamber 17, thereby completely exhausting the mixture of resin and hardener from chamber 17. The point of tapered end 29 enters outlet opening 21 to displace the mixture therefrom.

It will therefore be clear that no liquid mixture remains in the spray gun and that there is therefore no possibility for the spray gun to clog upon hardening of the mixture.

If it is desired to clean inlet openings 23 and 25 without shutting off the pressure, stopcock 37 may be turned to block liquid flow in both the resin and hardener lines, and thereafter plugs 31 may be removed for cleaning the inlet openings they close.

For the purpose of giving those skilled in the art a better understanding of the invention and a better appreciation of the advantages thereof, the following illustrative examples are given:

*Example I*

A liquid epoxy resin was selected which was the reaction product of bisphenol A with epichlorhydrin under alkaline conditions, having a melting point of 9° C., a viscosity of 12,400 centipoises at 25° C., a specific gravity at room temperature of 1.1676, an epoxy value of 0.52 as measured by the pyridinium chloride method, a hydroxyl value of 0.08 as measured by the lithium aluminum hydride method, and an esterification value of 1.26, sold commercially by Shell Chemical Corporation as "Epon 828." A body of this resin was established in container 61, and was there maintained at a temperature of 250° F., at which temperature it had a viscosity of 1 or 2 centipoises, about that of water.

As a hardener, the reaction product of a 60–40 weight ratio mixture of diethylenetriamine and the epoxide resin described immediately above was selected. A liquid body of this hardener was maintained in container 63 at a temperature of 185° F., at which temperature it had about the same viscosity as the heated resin. Gears 51 and 53 were selected so as to provide a resin-to-hardener feed ratio of 5 to 1. Adjustment screw 69 was set so that switch 67 would open at a pressure of 275 pounds per square inch.

The spray gun was used as described above, spray head 15 being held at a distance of about a foot from the surface sprayed. A large area was coated by spraying; and the spray operation was continued for about five hours, during which time the spray was repeatedly initiated and discontinued by manipulation of trigger 13. During this time, no sticking nor clogging of any portion of the spray gun was experienced.

The sprayed coating was uniform, smooth and glossy, with no surface irregularities such as streaking or pitting or the like. Upon striking the surface being sprayed, the resin formulation cooled to the ambient temperature in about one minute and became quite sticky and viscid. Thereafter, as curing proceeded at room temperature, the sprayed coating lost its tackiness and at the end of four hours was quite hard.

*Example II*

Example I was repeated, but coloring agents were added to the resin and hardener. 1.66 percent by weight of "cadmium yellow," a cadmium silicate, was added to the resin; and 9.1 percent by weight of "cobalt blue," a cobalt aluminate, was added to the hardener. Upon spraying, the very first droplets were a uniform green, thus indicating complete mixing; and upon the cessation of spraying, when the last several droplets were pushed from outlet opening 21 by plunger 27, these last few droplets were also a uniform green. The coating as sprayed was a uniform green even out to the outermost edges thereof.

On a tan kraft paper surface, the above proportions of coloring agents gave a green coating having complete coverage at a thickness of 7/1000ths of an inch.

From a consideration of all of the foregoing, it will be obvious that we have achieved all of the initially recited objects of our invention.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. Apparatus for applying a mixture of a plurality of liquids, comprising means defining a mixing chamber having a portion which is of uniform cross-sectional configuration throughout its length, the mixing chamber having a tapered end portion which terminates in an outlet opening, the mixing chamber having a plurality of spaced inlet openings on the portion of uniform cross-sectional configuration, the axes of the inlet openings being spaced from the tapered end portion, means for supplying a liquid under positive pressure to each of the inlet openings, and a plunger reciprocably slidable in the chamber toward and away from the outlet opening, the plunger having a first portion having an outer contour complementary to and of the same dimensions as the contour of the tapered end portion and a second portion having an outer contour complementary to and of the same dimensions as at least that part of the portion of uniform cross-sectional configuration which is adjacent the tapered end portion whereby when the plunger is sliding forwardly in the chamber toward the outlet opening, the plunger will first slide across and close the inlet openings and thereafter will fill the outlet end of the chamber completely to expel the liquids from the chamber through the outlet opening, said outer contour of said second portion of the plunger having a length sufficiently great to maintain the inlet openings closed when the plunger is in its forwardmost position in the chamber.

2. Apparatus as claimed in claim 1, said portion of uniform cross-sectional configuration being cylindrical, the inlet openings being diametrically opposed to each other and being spaced equal distances from the tapered end portion and equal distances from the outlet opening, the axes of the inlet openings being parallel to each other and spaced equal distances on opposite sides of the axis of the cylindrical portion of the mixing chamber and lying in a common plane perpendicular to the axis of the outlet opening, the outlet opening and the cylindrical portion of the mixing chamber being coaxial.

References Cited in the file of this patent

UNITED STATES PATENTS

| | | |
|---|---|---|
| 748,971 | Millspaugh | Jan. 5, 1904 |
| 1,265,768 | Fuller | May 14, 1918 |
| 2,430,697 | Allan | Nov. 11, 1947 |
| 2,543,941 | Sargent | Mar. 6, 1951 |
| 2,643,243 | Dannenberg | June 23, 1953 |
| 2,665,266 | Wasserman | Jan. 5, 1954 |
| 2,705,132 | Neville | Mar. 29, 1955 |
| 2,724,615 | Ariotti | Nov. 22, 1955 |
| 2,737,415 | Wheeler-Nicholson | Mar. 6, 1956 |
| 2,780,496 | Asbeck et al. | Feb. 5, 1957 |
| 2,814,471 | Carr et al. | Nov. 26, 1957 |

FOREIGN PATENTS

| | | |
|---|---|---|
| 211,815 | Germany | July 12, 1909 |